(12) United States Patent
Archer et al.

(10) Patent No.: US 7,600,095 B2
(45) Date of Patent: Oct. 6, 2009

(54) EXECUTING SCATTER OPERATION TO PARALLEL COMPUTER NODES BY REPEATEDLY BROADCASTING CONTENT OF SEND BUFFER PARTITION CORRESPONDING TO EACH NODE UPON BITWISE OR OPERATION

(75) Inventors: Charles J. Archer, Rochester, MN (US); Joseph D. Ratterman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 11/737,286

(22) Filed: Apr. 19, 2007

(65) Prior Publication Data

US 2008/0263320 A1 Oct. 23, 2008

(51) Int. Cl.
*G06F 15/16* (2006.01)
(52) U.S. Cl. .................................. 712/28; 712/30
(58) Field of Classification Search ................... None
See application file for complete search history.

(56) References Cited

U.S. PATENT DOCUMENTS 5,832,215 A * 11/1998 Kato et al. .................. 709/230
2002/0144027 A1* 10/2002 Schmisseur .................. 710/22

* cited by examiner

*Primary Examiner*—Kenneth S Kim
(74) *Attorney, Agent, or Firm*—Biggers & Ohanian, LLP

(57) ABSTRACT

Executing a scatter operation on a parallel computer includes: configuring a send buffer on a logical root, the send buffer having positions, each position corresponding to a ranked node in an operational group of compute nodes and for storing contents scattered to that ranked node; and repeatedly for each position in the send buffer: broadcasting, by the logical root to each of the other compute nodes on a global combining network, the contents of the current position of the send buffer using a bitwise OR operation, determining, by each compute node, whether the current position in the send buffer corresponds with the rank of that compute node, if the current position corresponds with the rank, receiving the contents and storing the contents in a reception buffer of that compute node, and if the current position does not correspond with the rank, discarding the contents.

18 Claims, 7 Drawing Sheets

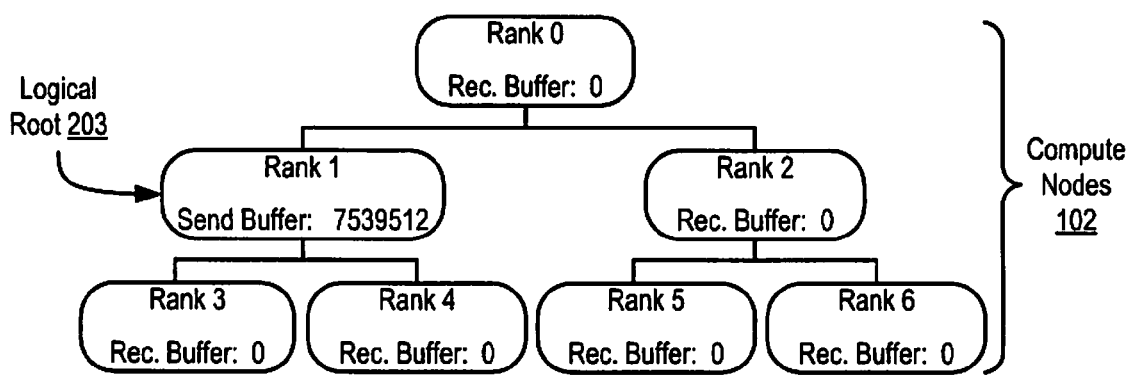
FIG. 7A: Beginning Buffer Status
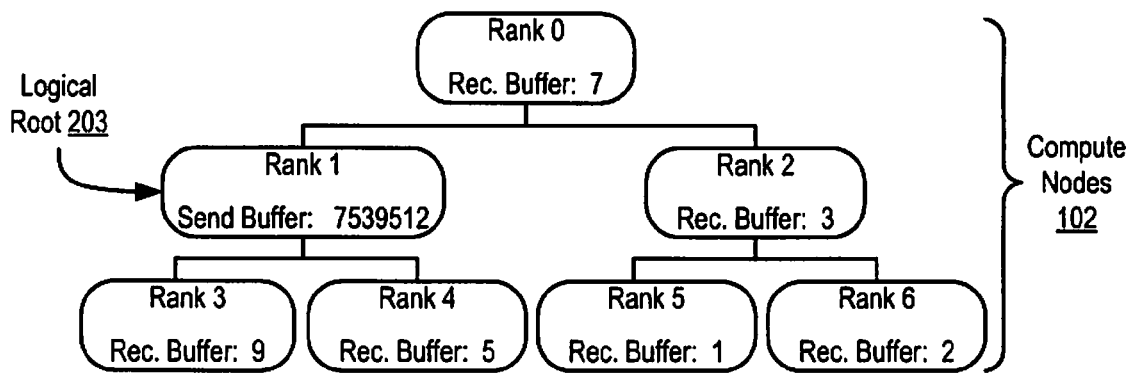
FIG. 7B: Buffer Status After Scatter

EXECUTING SCATTER OPERATION TO PARALLEL COMPUTER NODES BY REPEATEDLY BROADCASTING CONTENT OF SEND BUFFER PARTITION CORRESPONDING TO EACH NODE UPON BITWISE OR OPERATION

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for executing a scatter operation on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, a scatter. A scatter operation is a collective operation on an operational group of compute nodes that divides data on one compute node into segments and distributes a different segment to each compute node in the operational group. Because thousands of nodes may participate in collective operations on a parallel computer, executing a scatter operation on a parallel computer is always a challenge. If the group is large, and such groups may contain thousands of compute nodes, then the data communications cost of such an algorithm is substantial.

SUMMARY OF THE INVENTION

Methods, apparatus, and products are disclosed for executing a scatter operation on a parallel computer, the parallel computer comprising a plurality of compute nodes, the compute nodes organized into at least one operational group of compute nodes for collective parallel operations of the parallel computer, the compute nodes of the operational group coupled for data communications through a global combining network, each compute node in the operational group assigned a unique rank, and one compute node assigned to be a logical root. Executing a scatter operation on a parallel computer includes: configuring a send buffer on the logical root, the send buffer having positions, each position corresponding to a ranked node in the operational group and for storing contents scattered to that ranked node; and repeatedly for each position in the send buffer: broadcasting, by the logical root to each of the other compute nodes on the global combining network, the contents of the current position of the send buffer using a bitwise OR operation, determining, by each compute node, whether the current position in the send buffer corresponds with the rank of that compute node, if the current position in the send buffer corresponds with the rank of that compute node, receiving the contents and storing the contents in a reception buffer of that compute node, and if the current position in the send buffer does not correspond with the rank of that compute node, discarding the contents.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIGS. 7A and 7B set forth block diagrams of the same organizational group of compute nodes illustrated at reference on FIG. 6.

DETAILED DESCRIPTION OF EXEMPLARY EMBODIMENTS

Figure 1:
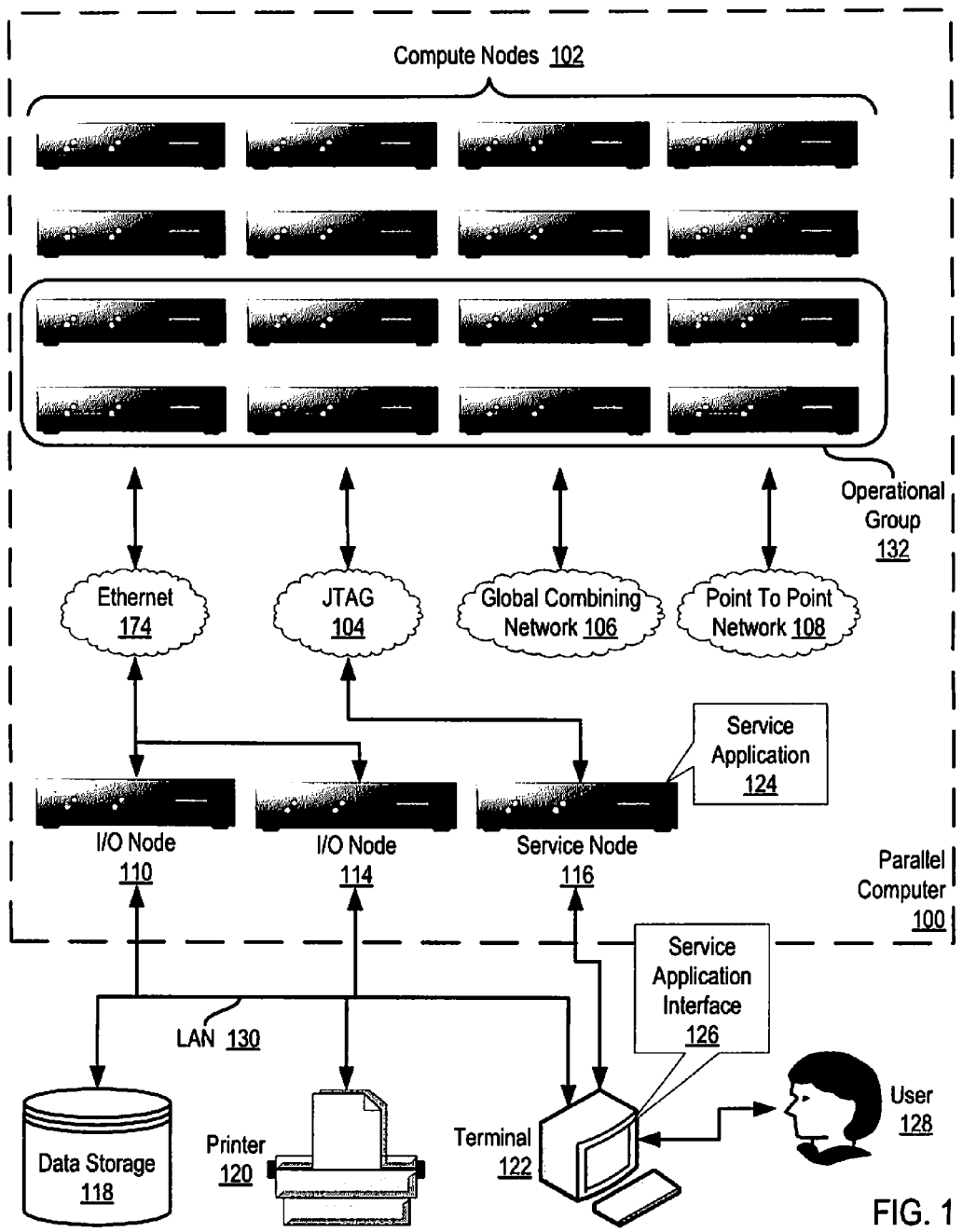
FIG. 1 illustrates an exemplary system for executing a scatter operation on a parallel computer according to embodiments of the present invention.

Exemplary methods, apparatus, and computer program products for executing a scatter operation on a parallel computer according to embodiments of the present invention are described with reference to the accompanying drawings, beginning with FIG. 1. FIG. 1 illustrates an exemplary system for executing a scatter operation on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point to point network (108) which is optimized for point to point operations using a torus network topology. The global combining network (106) is a data communications network that includes data communications links connected to the compute nodes so as to organize the compute nodes as a binary tree. Each data communications network is implemented with data communications links among the compute nodes (102). The data communications links provide data communications for parallel operations among the compute nodes of the parallel computer.

In addition, the compute nodes (102) of the parallel computer (100) are organized into at least one operational group (132) of compute nodes for collective parallel operations on parallel computer (100). An operational group of compute nodes is the set of compute nodes upon which a collective parallel operation executes. Each compute node in the operational group assigned a unique rank that identifies the particular compute node in the operational group. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for executing a scatter operation on a parallel computer according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

As described in more detail below in this specification, the system of FIG. 1 operates generally to execute a scatter operation on a parallel computer according to embodiments of the present invention by: configuring a send buffer on the logical root, the send buffer having positions, each position corresponding to a ranked node in the operational group and for storing contents scattered to that ranked node; repeatedly for each position in the send buffer: broadcasting, by the logical root to each of the other compute nodes on the global combining network, the contents of the current position of the send buffer using a bitwise OR operation, determining, by each compute node, whether the current position in the send buffer corresponds with the rank of that compute node, if the current position in the send buffer corresponds with the rank of that compute node, receiving the contents and storing the contents in a reception buffer of that compute node, and if the current position in the send buffer does not correspond with the rank of that compute node, discarding the contents.

A 'bitwise OR operation,' as the term is used in this specification, is an inclusive bitwise OR operation rather than an exclusive bitwise OR operation. The symbol for the inclusive bitwise OR function in the C and C++ programming languages is '|'. The inclusive bitwise OR function conducts a logical OR function separately on each bit of its operands. The effect is to turn bits on. For these operands, for example, x=00000000 00000001 00000000, in decimal, x=010, and
y=00000000 00000000 00000010, in decimal, y=002,
x=x|y yields x=00000000 00000001 00000010, in decimal, x=012. That is, all the bits that were on in each operand are also on in the result of the bitwise OR function.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group. In scatter operation, all processes typically specify the same receive count. The send arguments are only significant to the root process, whose buffer actually contains sendcount *N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, computer (100) includes input/output ('I/O') nodes (110, 114) coupled to compute nodes (102) through the data communications network (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The arrangement of nodes, networks, and I/O devices making up the exemplary system illustrated in FIG. 1 are for explanation only, not for limitation of the present invention. Data processing systems capable of executing a scatter operation on a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of executing a scatter operation according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Executing a scatter operation according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of executing a scatter operation according to embodiments of the present invention. The compute node (152) of FIG. 2 includes a plurality of computer processors (164) as well as random access memory ('RAM') (156). Processors (164) are connected to RAM (156) through a high-speed memory bus (154) and through a bus adapter (194) and an extension bus (168) to other components of the compute node. Stored in RAM (156) is an application program (158), a module of computer program instructions that carries out parallel, user-level data processing using parallel algorithms.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in executing a scatter operation on a parallel computer according to embodiments of the present invention, using a traditional programming language such as the C programming language, and using traditional programming methods to write parallel communications routines that send and receive data among nodes on two independent data communications networks. Alternatively, existing prior art libraries may be improved according to embodiments of the present invention. Examples of prior-art parallel communications libraries that may be improved for executing a scatter operation on a parallel computer according to embodiments of the present invention include the 'Message Passing Interface' ('MPI') library and the 'Parallel Virtual Machine' ('PVM') library. However it is developed, the parallel communications routines of parallel communication library (160) are improved to execute an allgather operation according to embodiments of the present invention by: configuring a send buffer on the logical root, the send buffer having positions, each position corresponding to a ranked node in the operational group and for storing contents scattered to that ranked node; repeatedly for each position in the send buffer: broadcasting, by the logical root to each of the other compute nodes on the global combining network, the contents of the current position of the send buffer using a bitwise OR operation, determining, by each compute node, whether the current position in the send buffer corresponds with the rank of that compute node, if the current position in the send buffer corresponds with the rank of that compute node, receiving the contents and storing the contents in a reception buffer of that compute node, and if the current position in the send buffer does not correspond with the rank of that compute node, discarding the contents.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
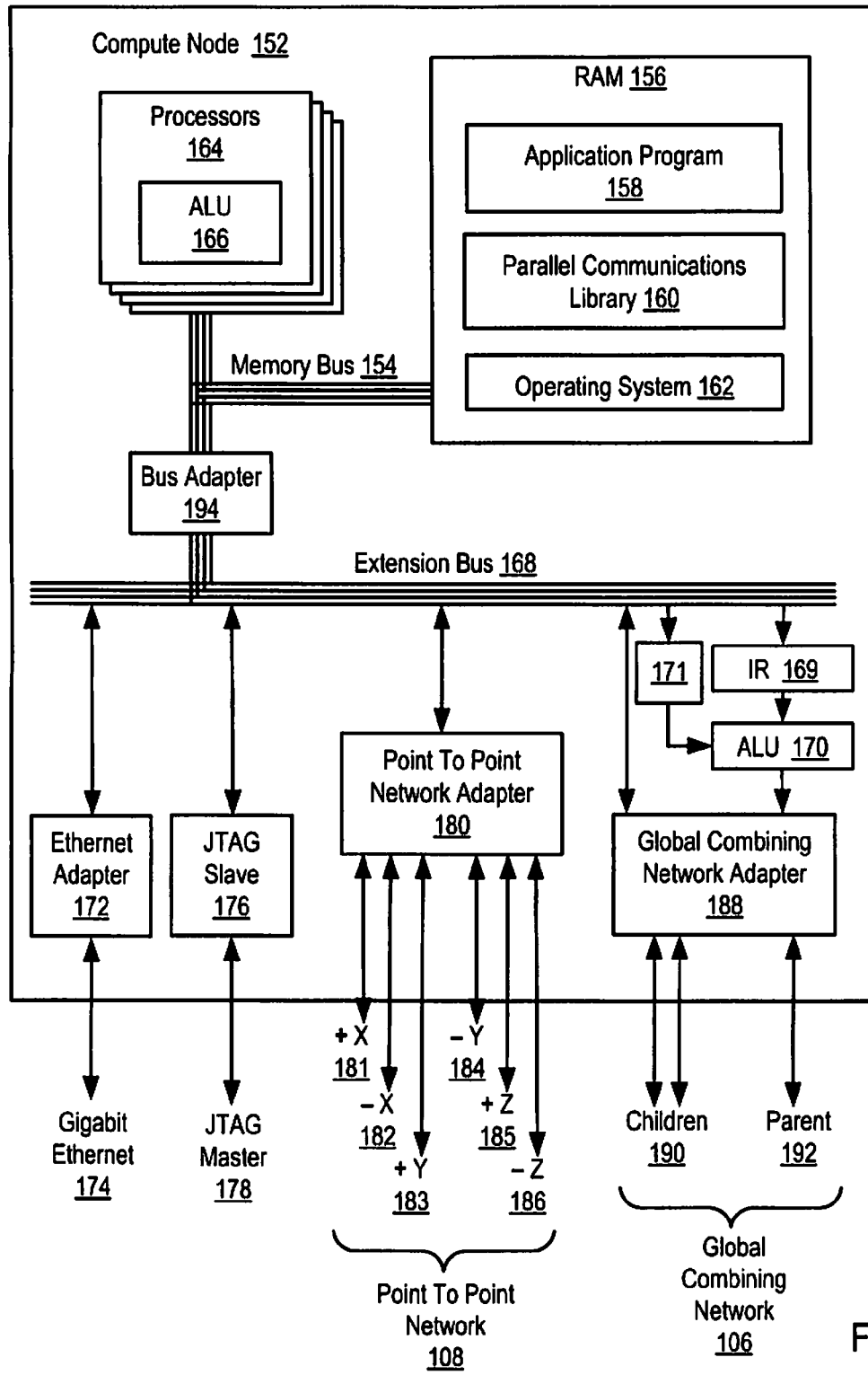
FIG. 2 sets forth a block diagram of an exemplary compute node useful in a parallel computer capable of executing a scatter operation according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that execute scatter operations according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in executing scatter operations according to embodiments of the present invention.

The data communications adapters in the example of FIG. 2 include a Point To Point Network Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (152) for data communications to a network (106) that is optimal for collective message passing operations such as, for example, a network configured as a binary tree. Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of global combining network adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, global combining network adapter (188) may execute the arithmetic or logical operation by use of ALU (166) in processor (164) or, typically much faster, by use dedicated ALU (170) using data provided by the nodes (190, 192) on the global combining network (106) and data provided by a processor (164) on the compute node (152).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processors (162) on the compute node (152) contribute data that alters the output of ALU (170) that is passed up or down the global combining network (106). Because the ALU (170) typically does not output any data onto the network (106) until the ALU (170) receives input from a processor (164), a processor (164) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (152) includes dedicated hardware (171) for injecting identity elements into the ALU (170) to reduce the amount of processor resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
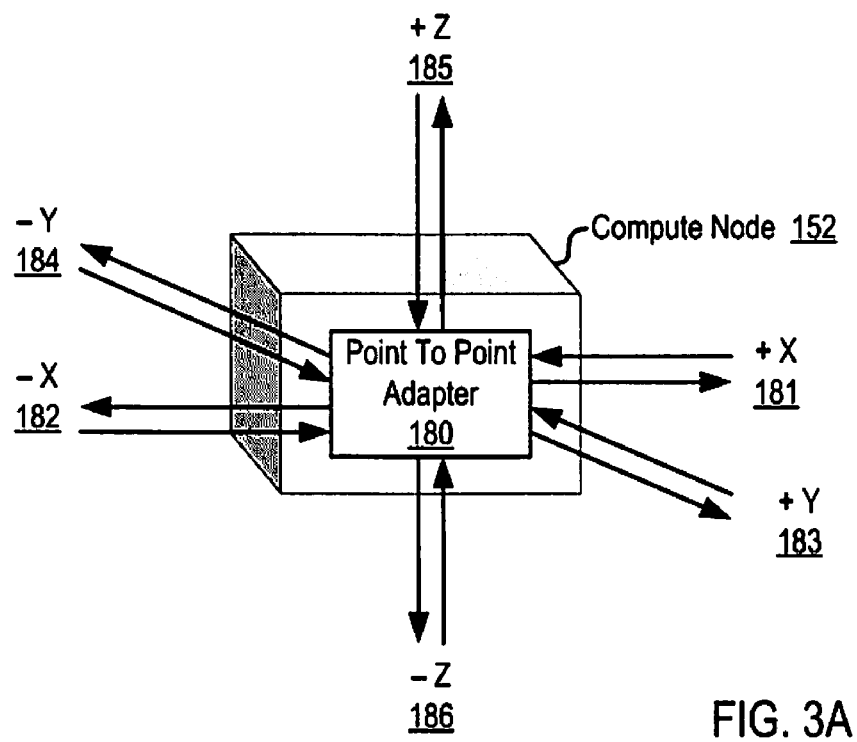
FIG. 3A illustrates a block diagram of an exemplary Point To Point Adapter useful in systems that execute scatter operations on a parallel computer according to embodiments of the present invention.

For further explanation, FIG. 3A illustrates a block diagram of an exemplary Point To Point Adapter (180) useful in systems that execute scatter operations on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
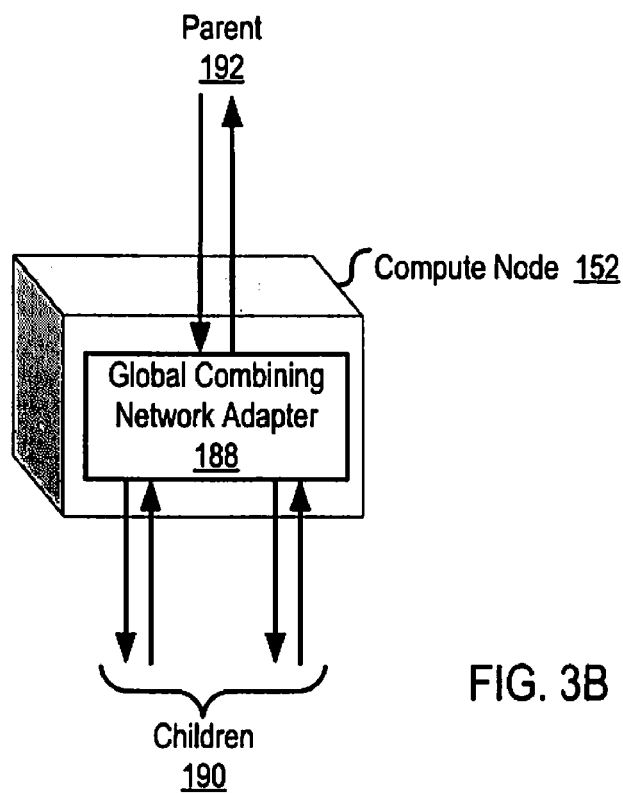
FIG. 3B illustrates a block diagram of an exemplary Global Combining Network Adapter useful in systems that execute scatter operations on a parallel computer according to embodiments of the present invention.

For further explanation, FIG. 3B illustrates a block diagram of an exemplary Global Combining Network Adapter (188) useful in systems that execute scatter operations on a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from two children nodes through four unidirectional data communications links (190). The global combining network adapter (188) also provides data communication to and from a parent node through two unidirectional data communications links (192).

Figure 4:
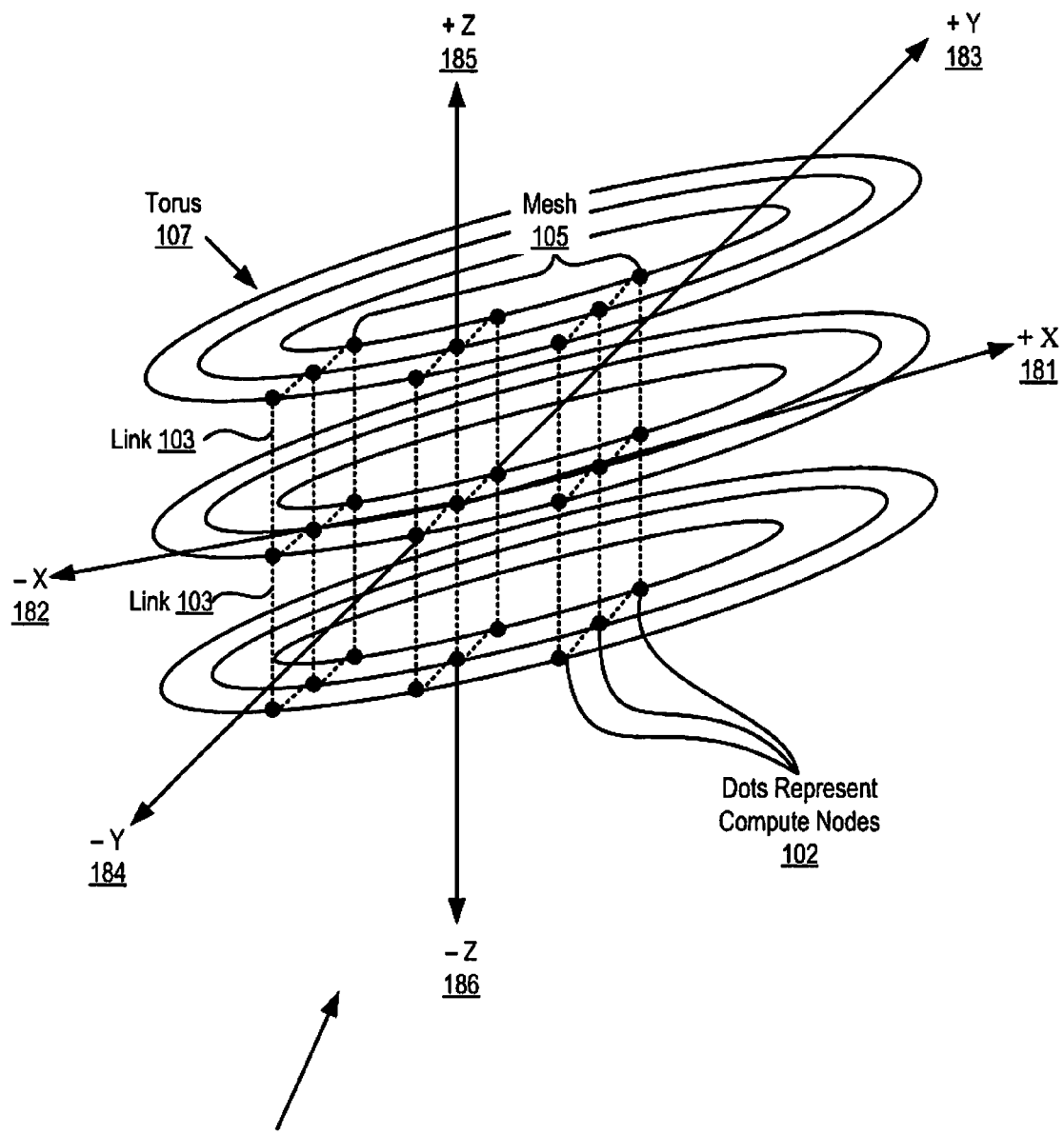
FIG. 4 sets forth a line drawing illustrating an exemplary data communications network optimized for point to point operations useful in systems that execute scatter operations on a parallel computer according to embodiments of the present invention.

For further explanation, FIG. 4 sets forth a line drawing illustrating an exemplary data communications network (108) optimized for point to point operations. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in executing a scatter operation on accordance with embodiments of the present invention may contain only a few compute nodes or may contain thousands of compute nodes.

Figure 5:
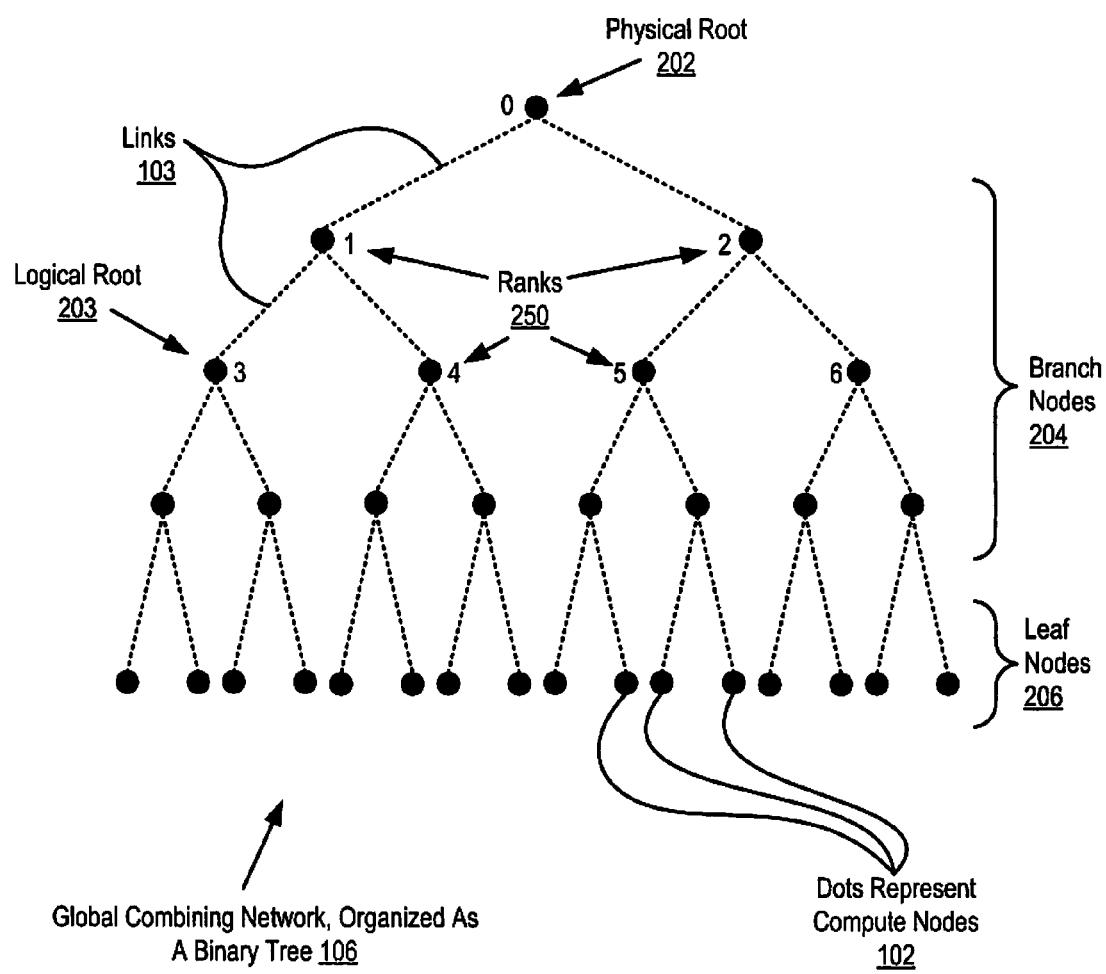
FIG. 5 sets forth a line drawing illustrating an exemplary global combining network useful in systems that execute scatter operations on a parallel computer according to embodiments of the present invention.

For further explanation, FIG. 5 sets forth a line drawing illustrating an exemplary global combining network (106) optimized for collective operations by organizing compute nodes as a binary tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network may be characterized as a physical root node (202), branch nodes (204), and leaf nodes (206). The physical root (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network optimized for collective operations for use in executing a scatter operation accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In the example of FIG. 5, the physical root node (202) is not to be confused with the logical root node (203). While the logical root node (203) executes the originating or receiving process in a particular collective operation, the physical root node (202) is the node physically configured at the top of the binary tree that effects data communications to all the nodes (102) in the binary tree. Consider, for example, that the nodes (102) execute a scatter operation. The logical root node (203) broadcasts contents of a send buffer to all the compute nodes (102) by contributing the contents to the global combining network, while at the same time all the other compute nodes contribute a value of zero to the global combining network. A bitwise OR operation is perform in the global combining network adapter in each compute node and the result is passed up to the physical root (202). Because each compute node combines the data from the compute node itself and the child nodes below the compute node using a bitwise OR operation, the result of the bitwise OR operation contained in the physical root (202) is the contents contributed by the logical root (203). Upon the results reaching the physical root node (202), the physical root (202) sends the results back down the tree to each compute node. Each compute node then receives and stores the portion of the result that corresponds to that compute node's rank and discards the other portions of the result.

Figure 6:
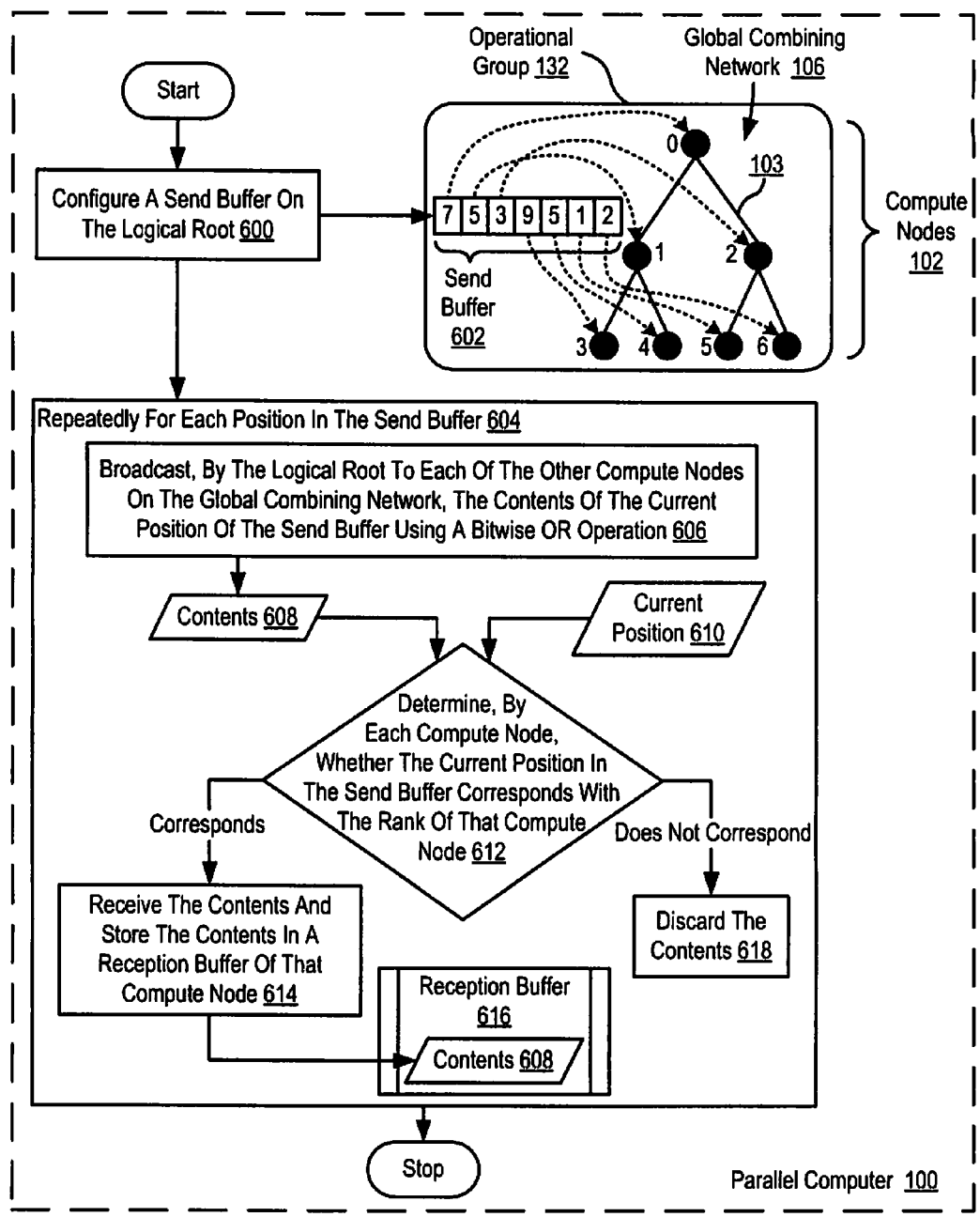
FIG. 6 sets forth a flow chart illustrating an exemplary method of executing a scatter operation on a parallel computer according to embodiments of the present invention.

For further explanation, FIG. 6 sets forth a flow chart illustrating an exemplary method for executing a scatter operation on a parallel computer (100) according to embodiments of the present invention. The parallel computer includes a plurality of compute nodes (102), represented here by black dots in global combining network (106). The compute nodes (102) of the operational group (132) are coupled for data communications through a global combining network (106). The global combining network (106) is a data communications network of parallel computer (100) that includes data communications links (103) connected to the compute nodes so as to organize the compute nodes as a binary tree. In this example, the data communications links (103) are represented by straight, solid lines connecting the dots that represent the compute nodes (102). In additional, in this example, each compute node has a separate ALU dedicated to parallel reduce operations. The separate, dedicated ALUs are not shown in FIG. 6, but they are of the kind illustrated and described above regarding reference (170) on FIG. 2.

In addition to their organization as a binary tree, the compute nodes (102) of parallel computer (100) are organized into an operational group (132) of compute nodes for collective parallel operations on parallel computer (100), and each compute node in the operational group is assigned a unique rank. The ranks are shown here as integers immediately adjacent to each computer node in operational group (132). The ranks in this example are assigned as a sequence of integers beginning with 0 assigned to the physical root node, 1 assigned to the first node in the second layer of the tree, 2 assigned to the second node in the second layer of the tree, 3 assigned to the first node in the third layer of the tree, and so on.

The method of FIG. 6 includes configuring (600) a send buffer (602) on the logical root. For purpose of explanation in the example of FIG. 6, the compute node having a rank of '1' is assigned to be a logical root for the scatter operation because the compute node having a rank of '1' is the compute node in this example from which all the other compute nodes receive data in the scatter operation. The send buffer (602) in the example of FIG. 6 has seven positions. Each position corresponds to a ranked node in the operational group (132), and each position is for storing contents scattered to that ranked node. For example, in the exemplary send buffer (602) of FIG. 6, the leftmost position in the buffer (602) corresponds to the node having a rank of '0,' the next position to the right in the buffer corresponds to the node having a rank of '1,' the next position to the right in the buffer corresponds to the node having a rank of '2,' the next position to the right in the buffer corresponds to the node having a rank of '3,' and so on.

In the example of FIG. 6, the size of each position in the send buffer (602) is the same, and the size of the contents broadcast to each of the other compute nodes is the same size of each position in the send buffer (602). In other embodiments, however, readers will note that the size of the contents broadcast to each of the other compute nodes may vary. In such embodiments where the size of the contents broadcast to each of the other compute nodes varies, the size of each position in the send buffer (602) matches the size of the contents contained in that position.

In the example of FIG. 6, all of the compute nodes (102) execute computer program instructions that initiate a scatter operation for the operational group (132). After all compute nodes in the operational group initiate a scatter operation, each compute node receives a control message indicating the beginning of the scatter operation and initializes a position counter. Because the logical root sends data to the other compute nodes from a send buffer one position at a time, each compute node uses the position counter to track the current position of data being sent in the send buffer on the logical root.

The method of FIG. 6 continues repeatedly (604) for each position in the send buffer (602) as follows:
 broadcasting (606), by the logical root to each of the other compute nodes on the global combining network, the contents (608) of the current position (610) of the send buffer (602) using a bitwise OR operation,
 determining (612), by each compute node, whether the current position (610) in the send buffer (602) corresponds with the rank of that compute node if the current position (610) in the send buffer (602) corresponds with the rank of that compute node, receiving (614) the contents (608) and storing the contents (608) in a reception buffer (616) of that compute node, and if the current position (610) in the send buffer (602) does not correspond with the rank of that compute node, discarding (618) the contents (608).

Turning now to each step carried out repeatedly (604): the logical root may broadcast (606) the contents (608) of the current position (610) of the send buffer (602) to each of the other compute nodes on the global combining network using a bitwise OR operation according to the method of FIG. 6 by contributing the contents (608) of the current position (610) of the send buffer (602) for a collective bitwise OR operation performed by all the nodes in the operational group (132) on the global combining network. Each of the other compute nodes may contribute a plurality of zeros for the collective bitwise OR operation performed by all the nodes in the operational group (132) on the global combining network. The number of zeros contributed to the bitwise OR operation typically corresponds to the number of bits in the operand of the bitwise OR operation. Each of the other compute nodes may contribute the plurality of zeros by injecting the zeros from dedicated hardware of that compute node. A bitwise OR operation is perform in the global combining network adapter in each compute node (102) and the result is passed up to the physical root having a rank of '0.' Because each compute node combines the data from the compute node itself and the child nodes below the compute node using a bitwise OR operation, the result of the bitwise OR operation contained in the physical root having a rank of '0' is the contents (608) contributed by the logical root having a rank of value '1.' Upon the results reaching the physical root node, the physical root sends the results back down the tree to each compute node. Each compute node then receives, through the global combining network, the results of the bitwise OR operation of all the contributions by all the compute nodes. That is, each compute node receives the contents (608) of the current position (610) of the send buffer (602).

Determining (612), by each compute node, whether the current position (610) in the send buffer (602) corresponds with the rank of that compute node according to the method of FIG. 6 may be carried out by determining whether a current value of the position counter (610) matches the rank of the compute node. If the current value of the position counter (610) matches the rank of the compute node, the compute node identifies that the current position (610) in the send buffer (602) corresponds with the rank of the compute node. If the current value of the position counter (610) does not match the rank of the compute node, the compute node identifies that the current position (610) in the send buffer (602) does not correspond with the rank of the compute node. Determining (612), by each compute node, whether the current position (610) in the send buffer (602) corresponds with the rank of that compute node according to the method of FIG. 6 may be further carried out by incrementing the current value of the position counter for the compute node. Each compute node may increment the current value of its position counter by the size of the current position (610) in the send buffer. Each compute node is informed of the size of each position in the send buffer when the scatter operation is initialized on each compute node.

As mentioned above, if the current position (610) in the send buffer (602) corresponds with the rank of that compute node, that compute node receives (614) the contents (608) for the current position (610) and stores the contents (608) in a reception buffer (616) of that compute node. The compute node may receive (614) the contents (608) for the current position (610) according to the method of FIG. 6 by retrieving the contents (608) from a FIFO reception stack for the global combining network adapter installed in the compute node. In the method of FIG. 6, that compute node may store the contents (608) in a reception buffer (616) allocated for the parallel communications library or application program installed on the compute node. The size of the reception buffer (616) is typically just large enough to stores the contents (608) for the current position (610). The parallel communications library or application program installed on the compute node may then access the contents (608) for further processing.

If the current position (610) in the send buffer (602) does not correspond with the rank of that compute node, that compute node discards (618) the contents (608). The compute node may discard (618) the contents (608) according to the method of FIG. 6 in any number of ways as will occur to those of skill in the art. The compute node may discard (618) the contents (608) according to the method of FIG. 6 by advancing an index pointer in a FIFO reception stack for the global combining network adapter by the size of the contents (608) so that the contents (608) in the FIFO stack is written over with new data received from the global combining network.

After performing the steps (606, 612, 164, 618) described above repeatedly (604) for each position in the send buffer (602), the scatter operation will be complete. The respective contents of the send buffer (602) corresponding to each ranked compute node will be stored in receive buffers on each of the compute nodes. For further explanation, FIGS. 7A and 7B set forth block diagrams of the same organizational group of compute nodes (102) illustrated at reference (132) on FIG. 6. Read together, FIGS. 7A and 7B illustrate a sequence of execution of the method of FIG. 6 with changes in buffer status.

FIG. 7A illustrates the status of the memory buffers in each compute node (102) of the operational group just after configuring the send buffer in step (600) of the method of FIG. 6. In the example of FIG. 7A, the logical root (203) having a rank of '1' includes a send buffer having seven positions. Each position of the send buffer corresponds to a ranked node in the operational group, and each position is for storing contents scattered to that ranked node. For example, in the exemplary send buffer of FIG. 7A, the leftmost position in the send buffer of the logical root (203) corresponds to the node having a rank of '0,' the next position to the right in the buffer corresponds to the node having a rank of '1,' the next position to the right in the buffer corresponds to the node having a rank of '2,' the next position to the right in the buffer corresponds to the node having a rank of '3,' and so on. Each of the other compute nodes has a reception buffer large enough to hold the contents in the position of the send buffer that corresponds to the rank of that compute node.

FIG. 7B illustrates the status of the memory buffers in each compute node (102) of the operational group just after repeatedly performing the steps in (604) of the method of FIG. 6 for each position in the send buffer. The logical root (203) broadcasts the contents '7' in the first position (leftmost position) of the send buffer to each of the other compute nodes on the global combining network using a bitwise OR operation. Because the first position corresponds to the compute node having a rank of '0,' the compute node having a rank of '0' receives the contents and stores '7' in its reception buffer, while all the other compute nodes discard the '7.' Next, the logical root (203) may broadcast the contents '5' in the second position of the send buffer to each of the other compute nodes on the global combining network using a bitwise OR operation. Because the second position corresponds to the logical root (203), the logical root (203) may receive the contents and store '5' in its reception buffer, while all the other compute nodes discard the '5.' As illustrated in FIGS. 7A and 7B, however, the logical buffer may opt not to broadcast the contents in the position of the buffer corresponding to its rank because the logical root (203) already has access to the contents for the second position in its send buffer. In fact, the logical root (203) may not even broadcast the second position to all the other nodes to improve performance of the scatter operation. In such an embodiment, all the nodes would increment their position counters accordingly. Next, the logical root (203) broadcasts the contents '3' in the third position of the send buffer to each of the other compute nodes on the global combining network using a bitwise OR operation. Because the third position corresponds to the compute node having a rank of '2,' the compute node having a rank of '2' receives the contents and stores '3' in its reception buffer, while all the other compute nodes discard the '3.' Next, the logical root (203) broadcasts the contents '9' in the fourth position of the send buffer to each of the other compute nodes on the global combining network using a bitwise OR operation. Because the fourth position corresponds to the compute node having a rank of '3,' the compute node having a rank of '3' receives the contents and stores '9' in its reception buffer, while all the other compute nodes discard the '9.' This process continues for each of the remaining positions in the send buffer.

Exemplary embodiments of the present invention are described largely in the context of a fully functional computer system for executing a scatter operation on a parallel computer. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for executing a scatter operation on a parallel computer, the parallel computer comprising a plurality of compute nodes, the compute nodes organized into at least one operational group of compute nodes for collective parallel operations of the parallel computer, the compute nodes of the operational group coupled for data communications through a global combining network, each compute node in the operational group assigned a unique rank, and one compute node assigned to be a logical root, the method comprising:
configuring a send buffer on the logical root, the send buffer having positions, each position corresponding to a ranked node in the operational group and for storing contents scattered to that ranked node; and
repeatedly for each position in the send buffer:
broadcasting, by the logical root to each of the other compute nodes on the global combining network, the contents of the current position of the send buffer using a bitwise OR operation,
determining, by each compute node, whether the current position in the send buffer corresponds with the rank of that compute node,
if the current position in the send buffer corresponds with the rank of that compute node, receiving the contents and storing the contents in a reception buffer of that compute node, and
if the current position in the send buffer does not correspond with the rank of that compute node, discarding the contents.

2. The method of claim 1 wherein broadcasting, by the logical root to each of the other compute nodes, the contents of the current position of the send buffer using a bitwise OR operation on the global combining network further comprises:
contributing, by the logical root, the contents of the current position of the send buffer;
contributing, by each of the other compute nodes, a plurality zeros; and
receiving, by each of the compute nodes through the global combining network, results of the bitwise OR operation of all the contributions by all the compute nodes.

3. The method of claim 2 wherein contributing, by each of the other compute nodes, a plurality of zeros further comprises injecting the zeros from dedicated hardware of that compute node.

4. The method of claim 1 further comprising:
receiving, by each compute node, a control message indicating the beginning of the scatter operation; and
initializing, by each compute node, a position counter,
wherein determining, by each compute node, whether the current position in the send buffer corresponds with the rank of that compute node further comprises:
determining whether a current value of the position counter matches the rank of the compute node,
if the current value of the position counter matches the rank of the compute node, identifying that the current position in the send buffer corresponds with the rank of the compute node,
if the current value of the position counter does not match the rank of the compute node, identifying that the current position in the send buffer does not correspond with the rank of the compute node, and
incrementing the current value of the position counter.

5. The method of claim 1 wherein:
the size of each position in the send buffer is the same; and
the size of the contents broadcast to each of the other compute nodes is the same.

6. The method of claim 1 wherein:
the size of the contents broadcast to each of the other compute nodes varies;
the size of each position in the send buffer matches the size of the contents contained in that position.

7. A parallel computer for executing a scatter operation on a parallel computer, the parallel computer comprising a plurality of compute nodes, the compute nodes organized into at least one operational group of compute nodes for collective parallel operations of the parallel computer, the compute nodes of the operational group coupled for data communications through a global combining network, each compute node in the operational group assigned a unique rank, and one compute node assigned to be a logical root, the parallel computer comprising computer processors, computer memory operatively coupled to the computer processors, the computer memory having disposed within it computer program instructions capable of:

configuring a send buffer on the logical root, the send buffer having positions, each position corresponding to a ranked node in the operational group and for storing contents scattered to that ranked node; and repeatedly for each position in the send buffer:

broadcasting, by the logical root to each of the other compute nodes on the global combining network, the contents of the current position of the send buffer using a bitwise OR operation, determining, by each compute node, whether the current position in the send buffer corresponds with the rank of that compute node, if the current position in the send buffer corresponds with the rank of that compute node, receiving the contents and storing the contents in a reception buffer of that compute node, and if the current position in the send buffer does not correspond with the rank of that compute node, discarding the contents.

8. The parallel computer of claim 7 wherein broadcasting, by the logical root to each of the other compute nodes, the contents of the current position of the send buffer using a bitwise OR operation on the global combining network further comprises:

contributing, by the logical root, the contents of the current position of the send buffer;

contributing, by each of the other compute nodes, a value of zero; and receiving, by each of the compute nodes through the global combining network, results of the bitwise OR operation of all the contributions by all the compute nodes.

9. The parallel computer of claim 8 wherein contributing, by each of the other compute nodes, a plurality of zeros further comprises injecting the zeros from dedicated hardware of that compute node.

10. The parallel computer of claim 7 wherein:

the computer memory also have disposed within it computer program instructions capable of:

receiving, by each compute node, a control message indicating the beginning of the scatter operation, and initializing, by each compute node, a position counter; and determining, by each compute node, whether the current position in the send buffer corresponds with the rank of that compute node further comprises:

determining whether a current value of the position counter matches the rank of the compute node, if the current value of the position counter matches the rank of the compute node, identifying that the current position in the send buffer corresponds with the rank of the compute node, if the current value of the position counter does not match the rank of the compute node, identifying that the current position in the send buffer does not correspond with the rank of the compute node, and incrementing the current value of the position counter.

11. The parallel computer of claim 7 wherein:

the size of each position in the send buffer is the same; and the size of the contents broadcast to each of the other compute nodes is the same.

12. The parallel computer of claim 7 wherein:

the size of the contents broadcast to each of the other compute nodes varies;

the size of each position in the send buffer matches the size of the contents contained in that position.

13. A computer program product for executing a scatter operation on a parallel computer, the parallel computer comprising a plurality of compute nodes, the compute nodes organized into at least one operational group of compute nodes for collective parallel operations of the parallel computer, each compute node in the operational group assigned a unique rank, the computer program product disposed upon a recordable medium for machine-readable information, the computer program product comprising computer program instructions capable of:

configuring a send buffer on the logical root, the send buffer having positions, each position corresponding to a ranked node in the operational group and for storing contents scattered to that ranked node; and repeatedly for each position in the send buffer:

broadcasting, by the logical root to each of the other compute nodes on the global combining network, the contents of the current position of the send buffer using a bitwise OR operation, determining, by each compute node, whether the current position in the send buffer corresponds with the rank of that compute node, if the current position in the send buffer corresponds with the rank of that compute node, receiving the contents and storing the contents in a reception buffer of that compute node, and if the current position in the send buffer does not correspond with the rank of that compute node, discarding the contents.

14. The computer program product of claim 13 wherein:

the size of each position in the send buffer is the same; and the size of the contents broadcast to each of the other compute nodes is the same.

15. The computer program product of claim 13 wherein:

the size of the contents broadcast to each of the other compute nodes varies;

the size of each position in the send buffer matches the size of the contents contained in that position.

16. The computer program product of claim 13 wherein broadcasting, by the logical root to each of the other compute nodes, the contents of the current position of the send buffer using a bitwise OR operation on the global combining network further comprises:

contributing, by the logical root, the contents of the current position of the send buffer;

contributing, by each of the other compute nodes, a value of zero; and receiving, by each of the compute nodes through the global combining network, results of the bitwise OR operation of all the contributions by all the compute nodes.

17. The computer program product of claim 16 wherein contributing, by each of the other compute nodes, a plurality of zeros further comprises injecting the zeros from dedicated hardware of that compute node.

18. The computer program product of claim 13 further comprising computer program instructions capable of:

receiving, by each compute node, a control message indicating the beginning of the scatter operation; and initializing, by each compute node, a position counter, wherein determining, by each compute node, whether the current position in the send buffer corresponds with the rank of that compute node further comprises:

determining whether a current value of the position counter matches the rank of the compute node, if the current value of the position counter matches the rank of the compute node, identifying that the current position in the send buffer corresponds with the rank of the compute node, if the current value of the position counter does not match the rank of the compute node, identifying that the current position in the send buffer does not correspond with the rank of the compute node, and incrementing the current value of the position counter.

* * * * *